L. M. SANDERS.
THROW-OFF MECHANISM FOR FISHING REELS.
APPLICATION FILED JUNE 16, 1916.
1,228,606. Patented June 5, 1917.
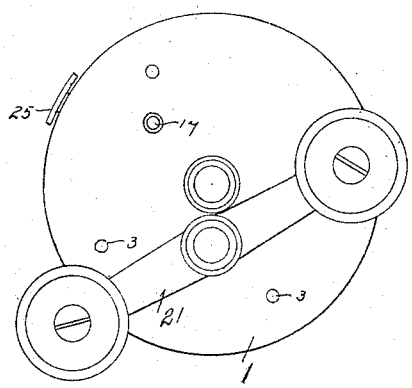
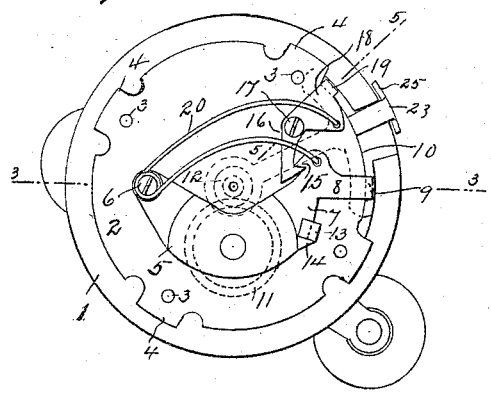
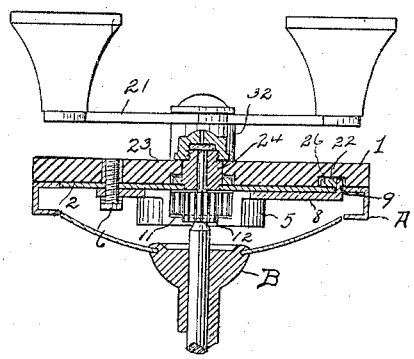
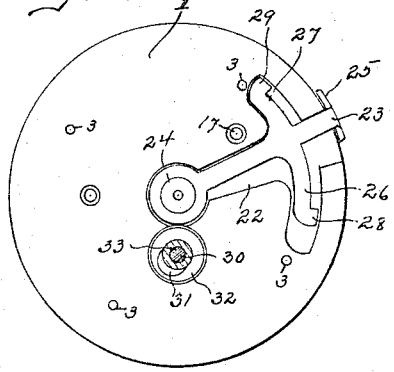
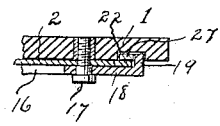
Louis M. Sanders INVENTOR.

UNITED STATES PATENT OFFICE.

LOUIS M. SANDERS, OF EAST ORANGE, NEW JERSEY, ASSIGNOR TO A. F. MEISSELBACH & BROTHER, A CORPORATION OF NEW JERSEY.

THROW-OFF MECHANISM FOR FISHING-REELS.

1,228,606.

Specification of Letters Patent.

Patented June 5, 1917.

Application filed June 16, 1916. Serial No. 103,920.

*To all whom it may concern:*

Be it known that I, LOUIS M. SANDERS, a citizen of the United States, residing in the city of East Orange, county of Essex, and State of New Jersey, have invented certain new and useful Improvements in Throw-Off Mechanism for Fishing-Reels, of which the following is a specification.

The object of my invention is to provide a simple, neat and effective throw-off mechanism for free spool fishing reels, whereby the entire throwing-off and throwing-on operation may be performed by the manipulation of a single lever always under the control of the operator.

In the accompanying drawings forming a part of this specification I have illustrated a single embodiment of my invention, but I do not desire to confine myself specifically to the form shown as other colorable variations of the same may be made by those skilled in the art without departing from the spirit or scope of my invention.

Fishing reels of the throw-off free spool type have long been known and used. Locking mechanism for locking the driving gears of the reel into and out of engagement have also been long known and used, but it has been customary in such structures to use one lever to bring the gears into engagement and locking the same in place, and another lever for disengaging such gears. The use therefore, of a single lever for performing both of these functions I regard as a valuable feature of my invention and therefore desire to claim the same broadly.

In the drawings:

Figure 1, is a front face view of a reel head-plate of a well known type now on the market.

Fig. 2, is a rear view of said head-plate removed from the body of the frame of the fishing reel.

Fig. 3, is a cross section on line 3—3 of Fig. 2.

Fig. 4, is a rear view of the head-plate similar to Fig. 2, but with the gears and connecting parts removed.

Fig. 5, is a cross section on line 5—5 of Fig. 2.

Similar reference numerals refer to like parts throughout the specification and drawings.

I have not deemed it necessary to illustrate the entire reel frame with the spool and its connected parts,—such reels are old and well known and require no extended description.

In the drawings, 1 is the head-plate, usually made of vulcanized rubber, fiber, or any other material suitable for the purpose; 2 is a metallic disk rigidly secured to the rear face of the head-plate 1 by means of the rivets 3. The disk 2 is provided with the projections 4, by which the head-plate is secured to the reel frame A. Mounted upon the face of said disk 2, is the swinging bridge 5, pivoted by means of the screw at 6, and having its other arm extended and lying flat upon the face of the disk as at 7. A projection from the arm 7 extends out over the edge of the disk 2, as at 8, and is provided with an upturned or inturned lug 9. The margin of the disk is cut away as at 10, for a considerable distance, as shown, to provide for the swinging of the upturned projection 9, around its pivot 6. The bridge 5 carries the main driving gear wheel 11, said gear wheel being in normal engagement with the pinion 12 which drives the reel spool B. At 13, I provide an overhanging lug which bears upon the upper surface of the extension 7, said lug 13 serving as a guide to limit the movement of the bridge 5 as it oscillates about the screw 6 as a center. I may provide a further limiting lug 14 on the side of the bridge 5, for engagement with the lug 13 in one of the positions occupied by the bridge 5.

The extension 7, is also provided with a hook 15, for engagement with the hook-shaped detent 16, which latter is pivoted at 17, upon the face of the disk 2. The detent 16 is provided with a tail-piece 18, the extreme end of which, 19, is turned up over the cut away edge 10, of the disk 2.

The two armed coil spring 20, is mounted with its coil fixed to the face of the disk 2, at any convenient point,—as for example under the head of the screw 6. The tendency of the arms of the spring 20, is to separate. These arms are curved around, and the outer one is pivotally connected to the tail-piece 18 of the detent 16, and the inner arm of said spring is pivotally connected to the hook 15 of the bridge 5.

If, now, the detent 16 and the hook 15 are engaged, as shown in Fig. 2, it will be seen that the bridge will be locked with the gear 11 in engagement with the pinion 12, in which position the operator, in rotating the crank 21, would wind up the reel. On the other hand, with the detent 16 disengaged from the hook 15, the spring 20 would cause the bridge 5 to swing away around the pivot 6 so as to carry the gear 11 free from the pivot 12. In such case the spool, being mounted upon the spindle carrying the pinion 12, will be free to rotate to pay out the line as in bait casting.

In order to provide means for locking and unlocking the detent 16, I make use of the following mechanism: In Fig. 4 I have shown a rear view of the head-plate 1, with the fastening disk 2 removed. At 22, I provide an irregularly shaped recess in the rear face of the plate 1; in said recess I locate the irregularly shaped lever 23, said lever being centered about the center bearing 24, in which the pivot of the spool spindle is mounted. The lever extends outwardly to the face of the disk and is provided with the finger piece 25, by which the lever 23 may be oscillated back and forth within the limits of the recess 22. Projecting laterally from the sides of the lever 23 are the two arc-shaped arms 26 and 27, provided respectively with the radially projecting lugs 28 and 29, in position to engage the upstanding projections 9 and 19 respectively on the bridge 5 and detent 16. The lugs 28 and 29 are spaced apart to a distance equal to the angular distance apart of the non-adjacent edges of the tail-piece 18 and the arm 8, when the parts are in the position illustrated in Fig. 2. If, now, the lever 23 is manipulated by means of the finger piece 25, so as to trip the detent 16 from the hook 15, the spring 20 will cause the bridge 5 to swing so as to carry the driving gear 11 free from the pinion 12, as heretofore described. If, now, it is desired to restore the parts, the finger piece 25 is moved in the opposite direction carrying the bridge 5, through the engagement of the lug 28 and the upward extension 9, whereby the bridge 5 is carried back into the position illustrated in Fig. 2, and at the proper instant the detent 16 will snap back into engagement with the hook 15, and the device is then locked.

The post 30 is rigidly mounted in the bridge, as is customary in such cases, and the rest of the mechanism is substantially the same as ordinarily found in fishing reels with the slight exception that in order to provide for the separation of the gear 11 from the pinion 12, it is necessary that there be play sufficient for the purpose, around the post 30. This is provided for by the slot 31 in the bearing sleeve 32, which surrounds the sleeve hub 33 of the gear 11. It should be understood that the sleeve bearing 32 is more in the nature of a protection to the post 30, than as a bearing. The crank 21 is rigidly secured to the sleeve hub 33, in the usual manner. It is not deemed necessary to illustrate these parts or describe them more in detail as they are well known in the art, and they and their equivalents are found upon almost every modern so-called multiple gear reel.

I claim:

1. In a throw-off mechanism for fishing reels, the combination of a spool pinion with a main driving gear in normal engagement therewith, a bridge pivoted at one end for supporting said gear, a hook at the opposite end of said bridge, a pivoted, spring actuated detent for locking said hook, said detent being provided with a tail-piece whereby said locking engagement may be broken, and said bridge being provided with an arm by which said locking engagement may be restored and a manually operated lever for alternate engagement with said tail piece and said arm to lock and unlock said bridge.

2. In a throw-off mechanism for fishing reels, the combination of a spool pinion with a driving gear in normal engagement therewith, a bridge for supporting said gear, said bridge being pivoted at one end and provided with a locking hook at its opposite end, a pivoted, spring actuated detent having normal locking engagement with said hook, and a spring in engagement with said bridge for swinging the same upon its pivot when said locking engagement is broken, whereby said gear is separated from said pinion and a pivoted manually operated lever for breaking and restoring said locking engagement.

3. In a throw-off mechanism for fishing reels, the combination of a spool pinion and a driving gear in normal engagement therewith, a bridge pivoted at one end for supporting said driving gear and having a locking hook at its opposite end, a locking detent for engagement with said hook, a two armed spring having one of its arms connected to said detent and its other arm connected to said hook, whereby when said detent is in engagement with said hook said spring tends to maintain said engagement, and when said engagement is broken said spring will swing said bridge upon its pivot to separate said gear from said pinion and a pivoted manually operated lever for breaking and restoring said locking engagement.

4. In a throw-off mechanism for fishing reels, the combination of a spool pinion and a driving gear in normal engagement therewith, a bridge pivoted at one end for supporting said driving gear and having a locking hook at its opposite end, a spring actuated locking detent for engagement with said hook, a spring connected with said hook for separating the same when disengaged and a pivoted lever having tripping engagement with said detent and restoring engagement with said bridge.

5. In a throw-off mechanism for fishing reels, the combination of a spool pinion and a driving gear in normal engagement therewith, a bridge pivoted at one end for supporting said driving gear, a locking hook at the opposite end of said bridge, a locking detent for engagement with said hook, a spring having its arms connected respectively with said hook and said detent for holding the same in engagement, and a pivoted lever having tripping engagement with said detent and restoring engagement with said bridge.

6. In a throw-off mechanism for fishing reels, the combination of a spool pinion with a main driving gear in normal engagement therewith, a bridge pivoted at one end for supporting said gear, a hook at the opposite end of said bridge, a pivoted, spring actuated detent for locking said hook, said detent being provided with a tail-piece and said bridge being provided with an arm, and a manually operated lever in position to engage said tail-piece to trip said detent when moved in one direction, and to engage said bridge arm and restore said locking engagement when moved in the opposite direction.

7. In a throw-off mechanism for fishing reels, the combination of a spool pinion with a driving gear in normal engagement therewith, a bridge for supporting said gear, said bridge being pivoted at one end and provided with a locking hook at its opposite end, a pivoted, spring actuated detent having normal locking engagement with said hook, a spring in engagement with said bridge for swinging the same upon its pivot when said locking engagement is broken, whereby said gear is separated from said pinion, and a lever in engagement with said bridge and said detent respectively for alternately restoring and tripping said locking engagement with said detent.

8. In a throw-off mechanism for fishing reels, the combination of a spool pinion and a driving gear in normal engagement therewith, a bridge pivoted at one end for supporting said driving gear and having a locking hook at its opposite end, a locking detent for engagement with said hook, a two armed spring having one of its arms connected to said detent and its other arm connected to said hook, whereby when said detent is in engagement with said hook said spring tends to maintain said engagement and when said engagement is broken said spring will swing said bridge upon its pivot to separate said gear from said pinion, and a manually operated lever for tripping said detent when moved in one direction, and for restoring said locking engagement when moved in the opposite direction.

In testimony whereof, I have hereunto set my hand this 14th day of June, 1916.

LOUIS M. SANDERS.

Copies of this patent may be obtained for five cents each, by addressing the "Commissioner of Patents, Washington, D. C."